May 14, 1935.　　　P. G. JOHNSON　　　2,001,614
PACKING FOR PIPE JOINTS
Filed Jan. 6, 1933
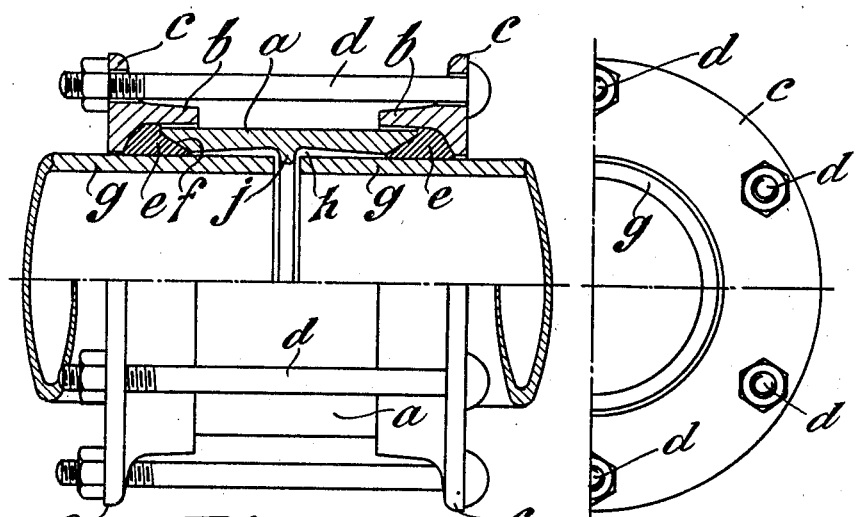
Fig. 1.　　Fig. 2.
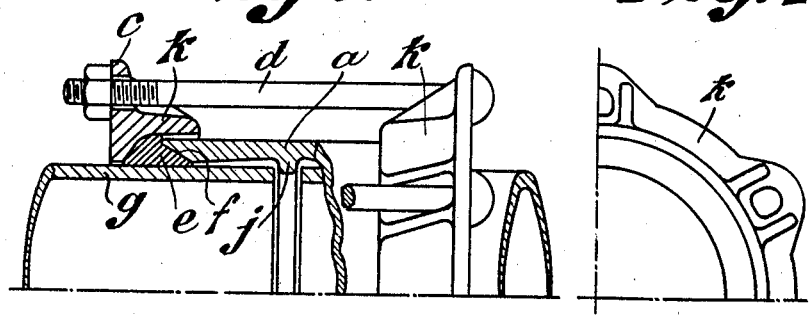
Fig. 3.　　Fig. 4.
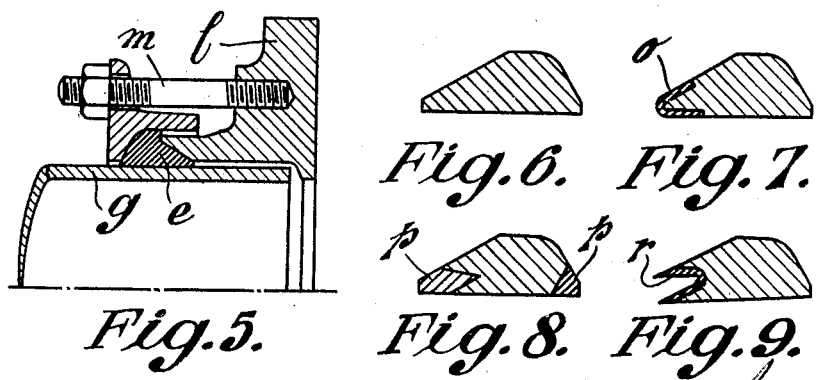
Fig. 5.　　Fig. 6.　　Fig. 7.
Fig. 8.　　Fig. 9.
Inventor:
Percy Graham Johnson
by Thomas S. Ashcraft
Atty.

Patented May 14, 1935

2,001,614

UNITED STATES PATENT OFFICE 2,001,614

PACKING FOR PIPE JOINTS

Percy Graham Johnson, Letchworth, England, assignor to Victaulic Company Limited, London, England Application January 6, 1933, Serial No. 650,571
In Great Britain January 22, 1932

3 Claims. (Cl. 288—1)

This invention relates to joints for pipes and other cylindrical bodies and has for its object to provide a coupling of simple construction that is flexible and can be readily applied. The joints are of the gland or double muff type in which a centre sleeve is located on the junction of two pipe ends and a loose flange is provided at each end of the centre sleeve. These two flanges are bolted together longitudinally over packing rings housed between the flanges and the ends of the centre locating sleeve.

The present invention comprises a joint for pipes and other cylindrical bodies and of the kind having a centre sleeve and end flanges containing deformable packing element, the packing elements being clamped in position between the centre sleeve and the end flanges by bolts passing through the flanges the main characteristic of which is that the centre sleeve and, preferably, the end flanges are made from rolled metal bar or strip of the correct cross section in which the recesses for the wedge shaped packing rings and the central locating stop are formed. Variations in the thickness of the sections are obtained by roll adjustment without changing the packing ring section. The invention further comprises a particular construction of such joints designed to provide flexibility.

In carrying the invention into practice the rolled section strips are cut to the correct length, bent round formers or between rolls and welded on the seams to form complete rings, which are afterwards sized to the correct diameter.

In the accompanying drawing

Figure 1 is a cross section of two tube ends to which a coupling in accordance with the present invention has been applied.

Figure 2 is a partial end view of the coupling shown in Figure 1.

Figures 3 and 5 are fragmentary views corresponding to Figure 1 of modified forms of coupling.

Figure 4 is a partial end view of the flange shown in Figure 3.

Figures 6, 7, 8 and 9 are sectional views illustrating important details of construction.

Referring to the drawing and particularly to Figure 1, the center sleeve $a$ and end flange $b$ are made from rolled metal sections bent or rolled round to a correct circular form and welded where necessary at the butting or meeting ends.

By employing the form of sections illustrated in Figure 1 machining is eliminated as the rounding of rolled sections can be carried out accurately in a press after welding.

Each of the end flanges $b$ has a radial flange $c$ which is drilled or punched to receive the bolts $d$ required for tightening the packing rings $e$ housed partially in the end flange $b$ and partly in the conically formed sleeve end $f$.

In order to provide for angular movement of the pipe end $g$ in the sleeve $a$, a recess $h$ is formed on each side of the center locating stop $j$ which projects between the adjacent pipe ends $g$.

In the design shown in Figures 3 and 4 a centre sleeve $a$ of the type indicated in Figure 1 is employed with cast end flanges $k$ where due to the coupling diameters difficulty is experienced in bending the T section end flange $b$ Figure 1.

In order to couple a flanged valve into a pipe line, cast or stamped flanged sleeves $l$ Figure 5 may be employed in conjunction with rolled end flanges $b$ or cast end flanges $k$, with separate packing tightening studs $m$.

Packing rings of wedge form Figure 6 made of rubber composition or other reinforcing material may be provided with edges $o$ of reinforcing material Figure 7 or lead or hard rubber edges $p$ Figure 8.

Figure 9 illustrates a form of self-sealing packing ring with sealing edges $r$, in the nature of lips, which when used in place of the solid packing ring $e$ in Figure 1 engage with the centre sleeve $a$ and pipe end $g$ and are held closely in contact by pressure from flange $b$. The sealing edges $r$ Figure 9 may be protected by a metal reinforcing lining $s$ and may be made with a wedge angle less than the normal recess angle between the sleeve $a$ and pipe end $g$, and such reinforcing material is shown in the drawing as of such a length as to leave a portion of the resilient material in contact with the pipe and metal surface of the inner cone of the sleeve.

In any of the above constructions the centre locating piece $j$ may be formed separately by a series of circumferential flat headed rivets, or it may be omitted altogether.

What I claim and desire to secure by Letters Patent is:—

1. A packing for a pipe coupling of the kind having a sleeve extending over the surfaces of the joined pipes and having internally coned ends into which the packing is held by mechanical pressure, the packing comprising a ring consisting of solid resilient material wedge-shaped in cross section with its inner surface engaging a surface of the pipe and its outer surface engaging a coned end of the sleeve, the said ring having a groove in its wedge-shaped edge, a metal lining in the groove operative to resist fluid pressure while the other portion of the ring is mechanically compressed.

2. A packing for a pipe coupling of the kind having a sleeve extending over the surfaces of the joined pipes and having internally coned ends into which the packing is held by mechanical pressure, the packing comprising a ring consisting of solid resilient material wedge-shaped in cross section with its inner surface engaging a surface of the pipe and its outer surface engaging a coned end of the sleeve, the said ring having a groove in its wedge-shaped edge, a metal lining in the groove, a portion of which merges with the pipe contacting surface of the said ring to resist fluid pressure while the other portion is mechanically compressed.

3. A packing ring for a pipe coupling of the kind having a sleeve extending over the surface of the joined pipe sections at their meeting ends and having internally coned ends into which the packing is held by mechanical pressure, the packing consisting of a ring of solid resilient material of wedge shaped cross section at each end of the sleeve having one of its wedge-shaped edges engaging the coned end of the sleeve and its other wedge-shaped edge engaging a gland provided with means for effecting pressure thereon axially, the wedge-shaped edges entering the coned end of the sleeve being provided therein with spaced lips and a reenforcing element on the adjacent surfaces of said lips acting in conjunction with said lips as a fluid pressure packing while the remaining portion of the double wedge-shaped packing ring is held tight by the means for effecting axial pressure.

PERCY GRAHAM JOHNSON.